United States Patent [19]
Gable

[11] 4,259,663
[45] Mar. 31, 1981

[54] CONTENTION INTERFERENCE DETECTION BY COMPARISON OF TRANSMITTED AND RECEIVED SIGNAL INFORMATION

[75] Inventor: Melvin G. Gable, Ypsilanti, Mich.

[73] Assignee: Ford Motor Company, Dearborn, Mich.

[21] Appl. No.: 46,580

[22] Filed: Jun. 7, 1979

[51] Int. Cl.³ .......................... H04Q 9/00; H04B 7/00
[52] U.S. Cl. ............................... 340/147 LP; 371/47; 371/71
[58] Field of Search ... 340/147 LP, 147 R, 146.1 AB, 340/146.1 AV, 146.1 BA, 146.1 E; 178/69 A, 69 G; 371/47, 68, 71

[56] References Cited

U.S. PATENT DOCUMENTS

| | | | |
|---|---|---|---|
| 3,786,187 | 1/1974 | Devita et al. ...................... | 178/69 A |
| 3,962,646 | 6/1976 | Tempka ......................... | 340/146.1 E |
| 3,965,294 | 6/1976 | Renz et al. ........................ | 178/69 A |
| 4,045,771 | 8/1977 | Loreck ....................... | 340/146.1 BA |
| 4,063,220 | 12/1977 | Metcalfe et al. .............. | 340/147 LP |

OTHER PUBLICATIONS

"Modem Wrap Back Test", W. A. Berglund, IBM Technical Disclosure Bulletin, vol. 9, No. 3, Aug. 1966, p. 278.

Primary Examiner—Donald J. Yusko
Attorney, Agent, or Firm—Peter Abolins; Clifford L. Sadler

[57] ABSTRACT

When a plurality of transceivers share a common communication medium or radio frequency channel, then collision interference will result when two or more transceivers transmit simultaneously. In order to detect this simultaneous transmission, an interference detector apparatus compares the received information after demodulation to that of the transmitted information before modulation. The classification of the distorted signals into either of the two decoded output states permits this interference to be detected with a comparison. The output from the interference detector is used to interrupt the transmitter when collision interference is present on the medium. It is also used to inhibit the receiver from generating erroneous data during the interference duration.

5 Claims, 2 Drawing Figures

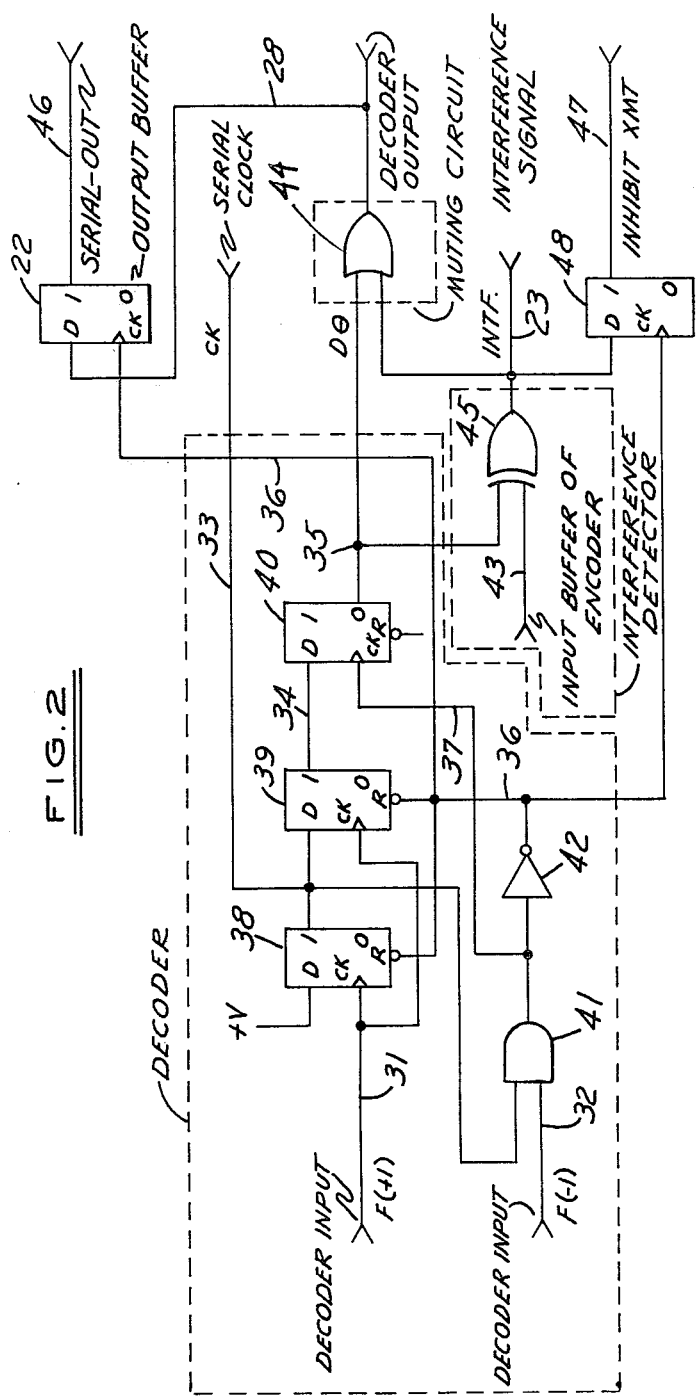

CONTENTION INTERFERENCE DETECTION BY COMPARISON OF TRANSMITTED AND RECEIVED SIGNAL INFORMATION

BACKGROUND OF THE INVENTION (1) Field of the Invention

The present invention relates to multipoint data communication transceiver or modem which is used on a shared communication medium with a plurality of transceivers.

(2) Prior Art

With respect to prior art relating to interference detection, it is known to have a collection of transceivers, each of which is attempting to transmit over a shared communication channel. When two separate source transmissions overlap in part or completely they will interfere and destroy each other. When the communication channel is characterized with a propagation delay between any source and destination nodes as being relatively small with respect to that of the transmission time, then it is more efficient to sense if the channel is idle before attempting transmission. The transceiver should be able to listen to the channel through the use of a carrier detect signal. If the carrier signal is heard then the transmitter will realize that the channel is in use and will defer or postpone its transmission until the channel is sensed to be idle.

This property of carrier deference, does not guarantee channel acquisition. Two or more transceivers may detect the channel idle and attempt transmission. However, the detection of carrier from another transmitter may take the end-to-end propagation delay of the medium. Therefore, interference from multiple simultaneous transmissions may occur. The user transmitting determines that its previous transmission was unsuccessful due to the absence of a positive acknowledgement from the receiving node. It then reschedules its transmission of data.

Consider the case where the transceiver can listen to its own transmission and determine when interference exists. When interference is detected it could then truncate transmission and reduce the collision period. If the smallest transmitted element (bit) on which interference can be detected is less than the propagation time "Td" over the medium then the channel is guaranteed to be captured after this time "Td". However, the transceiver can only be assured of medium capture after twice the propagation delay which is the round trip time to sense collision. Once a user transmission has been in progress for the end-to-end propagation medium time, all transmitters will be deferred and the transmission will complete without collision.

The essential function of a receiver is to classify the infinity of possible received signals into a finite number of information messages. The decoder classifies the demodulator output sequence into a number of classes corresponding to the possible transmitted input messages. When the decoder attempts to correct the noise induced errors made by the demodulator this is usually interpreted as an error correction process. Further discussion of error correction is in "Principles of Data Communication" by R. W. Lucky, J. Salc and E. J. Weldon, Jr., McGraw-Hill, 1968, Chapter 10. Errors can also be handled in an entirely different manner. The receiver may decode a sequence only if it corresponds to an acceptable message sequence. Otherwise it will notify the transmitter that errors have occurred. This technique is generally considered to be error detection.

With respect to the prior art of coding, error detection can be accomplished using code redundancy. If the set of valid codes is defined by a distance function then the degree of error detection can be defined. The "minimum distance" of a code is the smallest number of bits that any two coded words differ. A code is said to be error-detecting if its minimum distance is two or more. If the coding distance is three then any single error will change a valid code word into an invalid one which is a distance one away from the original coded word and a distance two from any other valid code word. Hence, in a code with minimum distance of three any single error is correctable or any double error detectable. Likewise, a code whose minimum distance is four may be used for either single error correction and double error detection or triple error detection. Error correction is possible when the received sequence of channel symbols contains redundancy. This is because only a fraction of the possible received sequence correspond to messages and the remainder indicate that certain types of errors have occurred.

Prior systems have performed this collision detection by the exclusive OR function on the modulated signal of the transmitter to that of the received signal by providing a delay substantially equal to the signal propagation delay through the transmitting and receive buffer circuits. This approach is described in U.S. Pat. No. 4,063,220 issued Dec. 13, 1977 entitled "Multipoint Data Communication System With Collision Detection". Such an apparatus for detecting collision on the modulated signal is very suceptible to phase shifts and noise on the medium. This technique would probably not be suitable for a noisy environment. An alternative apparatus is required which would protect the data from noise but allow interference induced by multiple transmissions (similar signals with different phase) to be detected during transmission on the shared channel.

SUMMARY OF THE INVENTION

In accordance with an embodiment of this invention, a decoder in a receiver must classify any distorted signal forms caused by the simultaneous transmission of two or more transceivers transmitting on a shared medium. To detect this simultaneous transmission, an interference detector apparatus compares the received information after being decoded, to that of the transmitted information before being encoded. The classification of the distorted signal forms into either of the two decoded output states permits this interference to be detected with this comparison means. However, this requires that we store both the transmitted and received information in buffers to perform this comparison. A useful storage capacity is twice that necessary to store a single transmission element. The accuracy with which this apparatus can detect interference is dependent on the out-of-phase and attentuation properties of the encoded information signals. The correlation of two or more encoded or modulated signals out-of-phase produces a decoded element which does not compare with the original element transmitted. The decoder design and the code redundancy employed in transmitting the information is chosen so that the foregoing apparatus is a dependable detector of collision interference. The interference signal is used to interrupt the transmitter when collision interference is present on the medium. It is also used to inhibit the receiver from generating erroneous data during the interference duration. This inhibiting of the receiver is implemented through the use of a squelch on muting circuit.

BRIEF DESCRIPTION OF THE DRAWINGS

FIG. 2 illustrates using conventional integrated circuits the implementation of a decoder employing an interference detector.

DESCRIPTION OF THE SPECIFIC EMBODIMENTS

Figure 1:
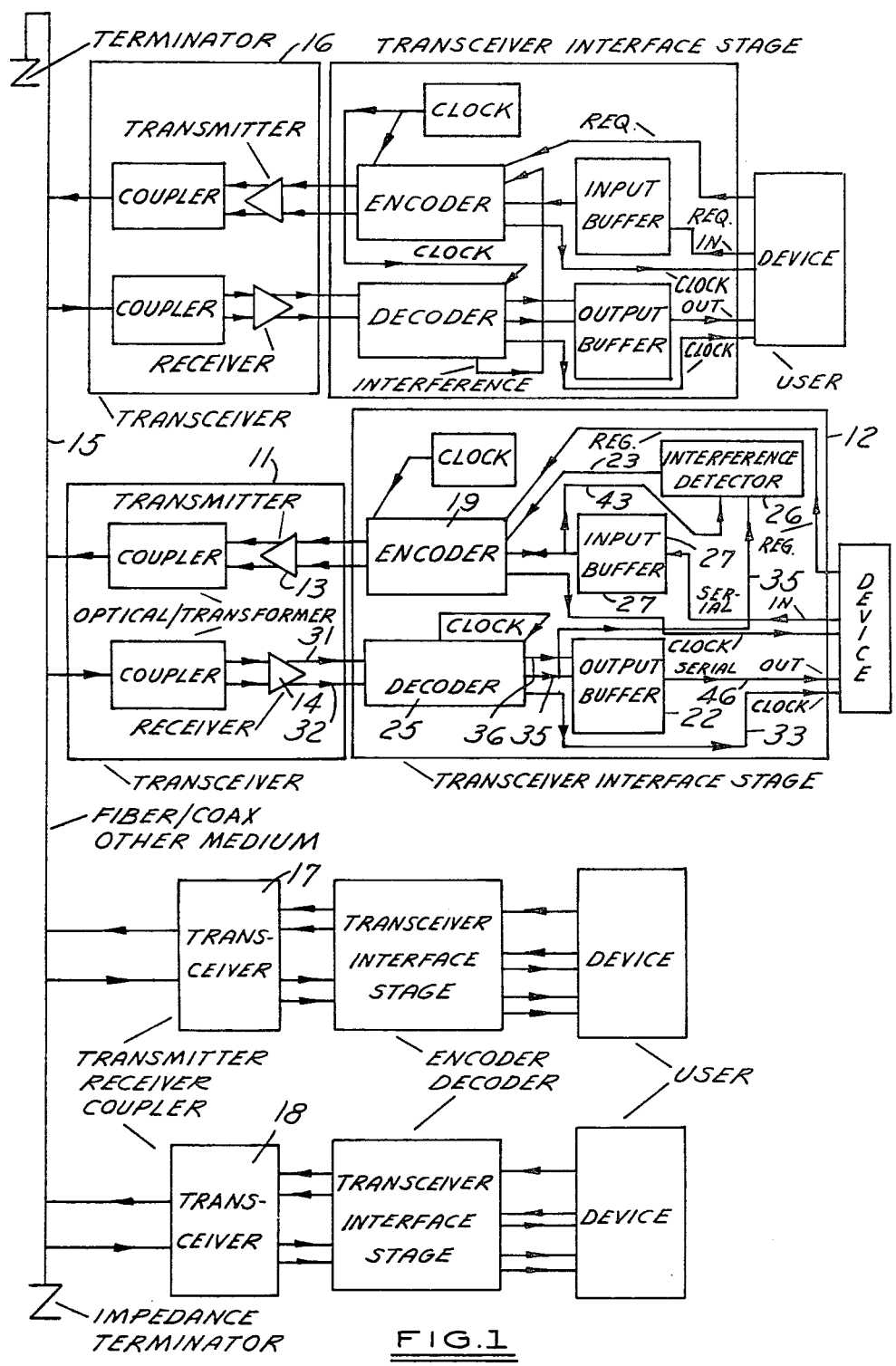
FIG. 1 is a block diagram of a communication modem which has been adapted to include an interference detector in accordance with an embodiment of this invention.

In reference to FIG. 1, the block diagram illustrates an implementation of a transceiver 11 and interface stage 12 of a data communication modem. The transceiver 11 contains a transmitter device 13 and receiver amplifier stage 14 which are both coupled to a communication medium 15. The other block diagrams of transceivers 16, 17, 18 illustrate the shared access to medium 15. The transceiver interface stage 12 has an encoder 14 which converts digital data from a computer or terminal device 20 into an encoded waveform required by the communication medium 15.

A receiver 14 amplifies the encoded signal before being processed by decoder 25 which stores its decoded output state in buffer register 22. The decoder classifies distorted signals into one of the output state. This permits interference to be detected by the comparison of the decoder output to that of the transmitted data. The interference detector 26 is coupled to buffer register, 27 and decoder 25 through an exclusive- OR gate that compares the received data from decoder 25 to that of the previous bit transmitted and stored in buffer 27. If buffer 27 and the decoder output (on line 35) are not identical then an interference signal (on line 23) is used to disable the encoder 19 from transmitting on the medium 15. The interference signal (on line 23) is also used to inhibit the decoder from generating an erroneous output signal 28 during the interference duration.

SELECTED IMPLEMENTATION

With the foregoing description of the invention the following will describe one selected implementation of a decoder 25 with an interference detector 26. This description will be based on conventional integrated circuit devices as shown in FIG. 2. This implementation is concerned with a binary digital information decoder whose output format is either a "zero" or "one" state. The encoded received signal of a canonical "zero" form is represented by the sequence $+1, 0, +1, -1, 0, -1$ and the sequence $+1, +1, 0, 0, -1, -1$ as a "one". Since the code sequence is ternary, it is first amplified by a differential amplifier (not shown) which separates the positive and negative signal elements, the positive output $F(+1)$ (on line 32) as well as the negative output $F(-1)$ (on line 32) from the differential amplifier are then processed by the decoder in FIG. 2. The output (on line 33) of the first flip-flop 38 is connected to the input of the second flip flop 39. Hence, when the second flip-flop 39 is clocked, it will take on the previous state of the first flip-flop 38. The transition of the $F(+1)$ signal (on line 31) is used to clock both the first flip-flop 38 and the second flip-flop 39. When the first flip-flop 38 is set, the $F(-1)$ (on line 32) signal is used to reset both flip-flops 38, 39 through buffer 42. The signal from AND gate 41 is used to clock a third flip-flop 40 which stores the current decoded output state (on line 35). The serial clock output state (on line 33) is obtained by the transition of the first flip-flop 38. Interference is detected by comparing, through an exclusive OR gate 45 the received bit (on line 35) to that of the transmitted bit (on line 43) which produces an interference output signal (on line 23). The interference signal (on line 23) is coupled to a flip-flop 48 which is clocked by the output of inverter 42. Flip-flop 48 has an output signal (on line 47) which is used to inhibit the encoder 19 from transmitting. The interference signal (on line 23) as well as the decoder signal (on line 35) are coupled to an OR gate 44 which acts to squelch or mute the output (on line 35 and to hold the decoder output signal (on line 28) to a "1" state when interference is detected. The decoded output signal (on line 28) is coupled to output buffer flip-flop 22 which store the output state and generates the series 1 out signal (on line 46).

A data communication system suitable for use with this invention is further described in a copending application entitled "Communication Broadcast Channel Interface", Ser. No. 016,468, filed on even data herewith, assigned to the assignee of this application, the disclosure of which is hereby incorporated by reference.

Various modifications and variations will no doubt occur to those skilled in the various art to which this invention pertains. For example, the particular implementation of the concepts discussed above may be varied from that disclosed herein. These and all other variations which basically rely on the teachings through which this disclosure has advanced the art are properly considered with the scope of this invention as defined by the appended claims.

We claim:

1. A synchronous data communication modem adapted to be connected to a communication medium shared by a plurality of other synchronous data communication modems, said communication modem having inputs for receiving a plurality of input signals representing input states, each input state being encoded into a unique one of a plurality of canonical forms transmitted over said communication medium, said modem comprising:

an encoding (modulator) means for inserting signal information in a transmitted signal;

a decoding means for extracting signal information from a received signal from said communication medium and provided a decoded output in one of a plurality of output states corresponding to said input states and classifying signals not of canonical form into one of the output states, the number of said output states being equal to the number of said input states;

a first storage buffer means coupled to said encoding means for temporary storage of transmitted signal information;

and a comparator means connected to said first storage buffer for comparing information stored in said first buffer to that of the decoder output and for generating an interference detection signal due to contention by multiple transmitters over said communication medium if the compared information is not the same.

2. A synchronous data communication modem as recited in claim 1 wherein said comparator means is coupled to said encoder means for interrupting the transmitted signal.

3. A synchronous data communication modem adapted to be connected to a communication medium shared by a plurality of other synchronous data communication modems, said communication modem having inputs for receiving a plurality of input signals representing input states, each input state being encoded into a unique one of a plurality of canonical forms transmitted over said communication medium, said modem comprising:

an encoding (modulator) means for inserting signal information in a transmitted signal;

a decoding means for extracting signal information from a received signal from said communication medium and providing a decoded output in one of a plurality of output states corresponding to said input states and classifying signals not of canonical form into one of the output states, the number of said output states being equal to the number of said input states;

a first storage buffer means coupled to said encoding means for temporary storage of transmitted signal information;

a comparator means connected to said first storage buffer for comparing information stored in said first buffer to that of the decoder output and for generating an interference detection signal due to contention by multiple transmitters over said communication medium if the compared information is not the same; and a squelch or muting circuit for inhibiting the generation of erroneous data, said squelch or muting circuit being connected between said decoding means and said second storage buffer means and connected to said comparator means so that said comparator means can control the operation of said squelch or muting circuit.

4. A synchronous data communication modem as recited in claim 3 wherein said decoding means is adapted to classify into a single of said plurality of output states all received signals with insufficient signal information to enable correct classification into one of said output states so that signals having sufficient error correcting properties are classified correctly and signals having insufficient error correcting properties to permit correct classification are classified into only one arbitrary output state.

5. A synchronous data communication modem as recited in claim 3 wherein said comparator means is coupled to said encoder means for interrupting the transmitted signal.

* * * * *